March 21, 1961     W. A. VAUGHN     2,976,310
MULTIPLE STEP CONTINUOUS CONTACTING OF IMMISCIBLE SUBSTANCES
Filed May 31, 1957
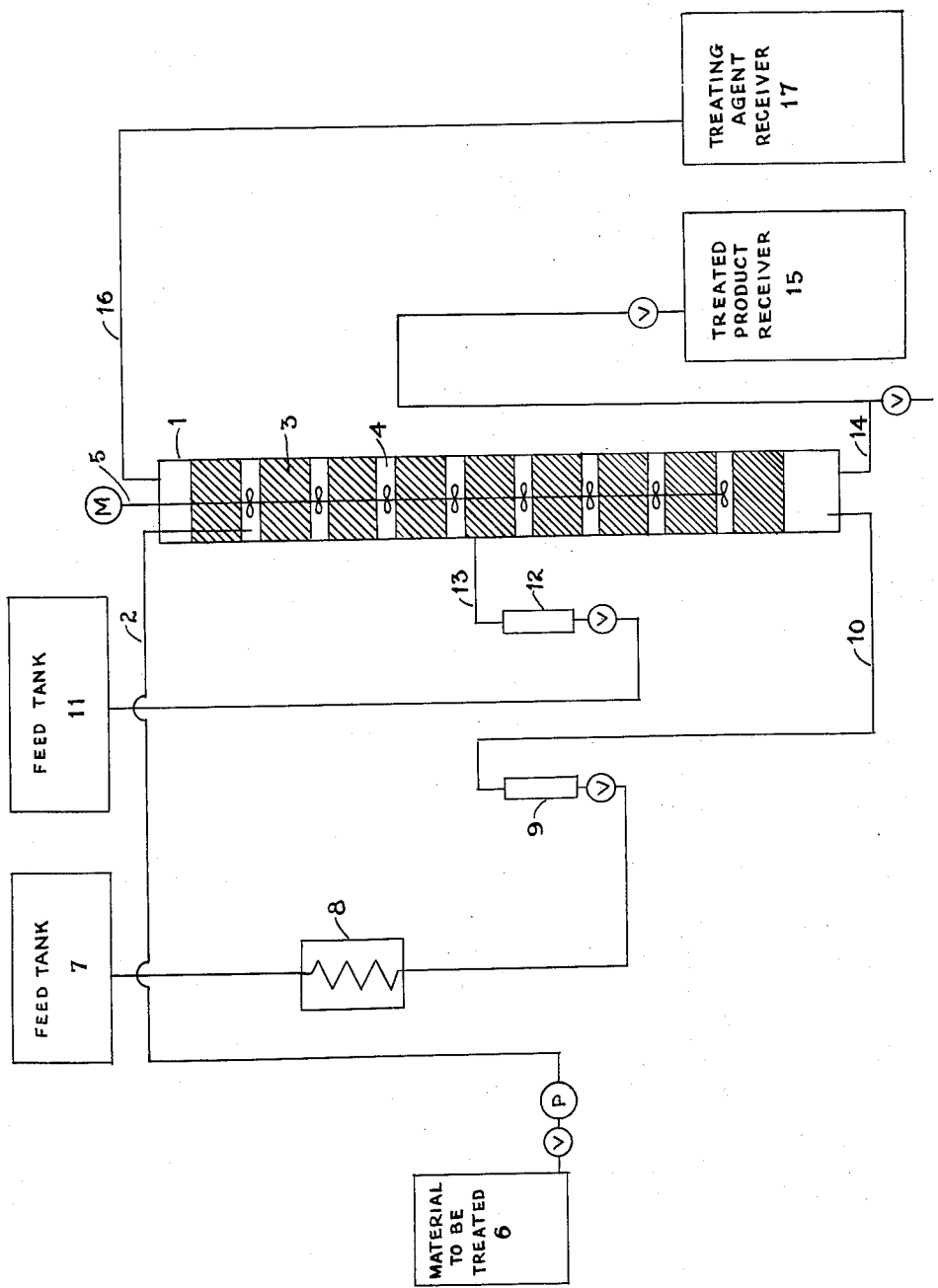
INVENTOR.
WILLIAM A. VAUGHN
BY Richard O. Zerbe
AGENT.

United States Patent Office

2,976,310
Patented Mar. 21, 1961

2,976,310

MULTIPLE STEP CONTINUOUS CONTACTING OF IMMISCIBLE SUBSTANCES

William A. Vaughn, St. Albans, W. Va., assignor to Monsanto Chemical Company, St. Louis, Mo., a corporation of Delaware Filed May 31, 1957, Ser. No. 662,732

3 Claims. (Cl. 260—461)

The present invention relates to a method for multiple contacting of a substance continuously with immiscible substances differing in composition but miscible with each other.

In the chemical processing industry several steps frequently have to be performed in a particular order. Examples comprise removal of an impurity which interferes with a subsequent operation, reduction of acidity for subsequent operation in which free acid would be objectionable and reduction of alkalinity for subsequent processing in which alkali would be objectionable. Whether it is desired to remove something from or to add something to a composition, the composition must be brought into adequate intimate contact with the reagents. The present invention relates to situations where the substance to be contacted is immiscible with the treating substances.

The invention is particularly applicable to washing of liquid organic chemicals to remove by-products. When successive washes differing in composition are required, batchwise washing is a simple operation and a requirement for different washes and a particular order of contacting introduces no problems. To accomplish the same result continuously is much more difficult. The present invention combines a multiple step washing operation into a single continuous process.

In accordance with the present invention, a method for multiple contacting of a substance continuously with immiscible substances differing in composition but miscible with each other is provided which comprises continuously feeding the composition to be contact treated into a mixing zone and passing it counter-currently through successive regions of contact, one immiscible substance being introduced at a point remote from the feed point and a second immiscible substance miscible with the first being introduced at an intermediate point and withdrawing continuously the combined treating substances and treated product.

The accompanying drawing illustrates an apparatus and system eminently suitable for carrying out the principles of the invention, although this is only illustrative. The material to be treated is pumped from the container 6 into the top of an extraction column 1 through line 2. The column contains nine wire mesh coalescing sections 3 separated by eight mixing sections 4, each of which is agitated by the stirrer 5. The extraction colum is of glass 6 feet high and 3 inches inside diameter. The coalescing sections are 5 inches high separated by 1½ inch mixing sections. The agitator is a series of four-bladed turbines on a single shaft driven by an air motor. Each turbine is 1⅜ inches in diameter and ⅜ inch thick. One of the materials to be contacted is fed from container 7 through a preheater of steam-jacketed pipe 8 and a rotameter 9 into the bottom of the column through line 10. The second treating substance is fed from container 11 through rotameter 12 into the middle of the column through line 13. The treated material is continuously removed from the bottom of the column through line 14 to storage container 15. The combined reagents used in the treatment are drawn from the top of the column through line 16 into container 17. It will be appreciated that the materials of construction, the dimensions of the column and agitator may be varied as may the composition of the packing.

In one specific embodiment of the invention, the material to be treated is a slurry of inorganic salts and a heavy organic liquid constituting about 60 percent of the total weight. Besides the large amount of salts to be removed, the organic liquid also contains 1 to 2 percent of a phenolic compound which has to be reduced to 0.1 percent or less. The phenol can be removed by washing with soda ash solution to form the sodium phenate and then water washing to remove the sodium phenate. It is necessary to remove the salts before contacting the organic liquid with soda ash because sodium bicarbonate, one of the salts in the crude slurry, buffers the system at such a low pH that the sodium phenate cannot be formed. Therefore, three separate operations are needed: A wash to remove the inorganic salts, a soda ash wash to form the sodium phenate, and a water wash to remove the sodium phenate.

The three-step washing is accomplished in the extraction column described. In the upper section of the colum the crude product is contacted with wash water to remove the solid salts. The combined washes from feed tanks 7 and 11 rising through the upper section of the column contact the descending organic liquid thereby removing water-soluble salts. The organic liquid then passes into the center section where dilute soda ash solution from tank 11 feeding into the middle of column through line 13 converts the phenol to sodium phenate. In the lower half of the column, fresh water from tank 7 feeding into the bottom of the column through line 10 extracts the sodium phenate, and the washed organic liquid is removed from the bottom through line 14. The fresh water stream fed at the bottom picks up sodium phenate as it rises through the bottom half of the column. At the midpoint of the column soda ash solution, added to the rising water stream, forms a dilute soda ash solution above the feed point, where the free phenol is converted to sodium phenate. The dilute soda ash solution, containing the extracted sodium phenate, then continues to rise toward the top of the column where the solid salts in the entering crude slurry are dissolved. The water leaving the column contains sodium phenate, excess soda ash and inorganic salts.

To start the operation, hot water is fed for several minutes to heat the column. When the effluent water is warm, the water flow is reduced to the required rate and soda ash solution fed to build up the soda ash concentration in the upper portion of the column. When both water and soda ash solution flow is steady, the slurry of salts and organic liquid is pumped, at the proper rate, into the top mixing section. Where the slurry contains a high proportion of inorganic salts it is preferably fed into the top mixing section, instead of into the top coalescing section in order to prevent deposition of solids on top of and throughout the first coalescing section.

Typical data are shown in Table I. In the first four runs the organic liquid is O-p-nitrophenyl O,O-dimethylphosphorothioate, the phenol impurity being p-nitrophenol. In the remaining runs the organic liquid is O-p-nitrophenyl O,O-diethylphosphorothioate, the phenol impurity again being p-nitrophenol. The feed rates are reported in lbs./hr./ft.$^2$ as well as in lbs./hr. in order to provide data directly applicable to any size equipment. The data in the section of the analysis labeled "Rewashed" refers to values after washing the processed product with water in a separatory funnel until the phenol content is constant. This gives the portion of the total phenol content insoluble in water. The portion of the total phenol removed by rewashing in a separatory funnel is present as the water-soluble sodium phenate. This value, obtained by the difference of the total phenol and free phenol, is reported as sodium phenate.

Table I

| Run No. | 1 | 2* | 3 | 4 | 5 | 6 | 7 | 8 | 9* | 10 | 11 | 12 |
|---|---|---|---|---|---|---|---|---|---|---|---|---|
| Water Rate: | | | | | | | | | | | | |
| lbs./hr. | 120 | 150 | 60 | 120 | 90 | 120 | 80 | 120 | 150 | 100 | 100 | 120 |
| lbs./hr./ft.² | 2,450 | 3,060 | 1,225 | 2,450 | 1,835 | 2,450 | 1,630 | 2,450 | 3,060 | 2,040 | 2,040 | 2,450 |
| Crude Slurry Rate: | | | | | | | | | | | | |
| lbs./hr. | 30 | 30 | 15 | 30 | 20 | 34 | 30 | 28 | 40 | 30 | 33 | 29 |
| lbs./hr./ft.² | 613 | 613 | 306 | 613 | 613 | 700 | 408 | 570 | 805 | 618 | 680 | 597 |
| Soda Ash Rate, 100% Basis: | | | | | | | | | | | | |
| lbs./hr. | 1.15 | 1.15 | 0.26 | 0.50 | 0.40 | 0.60 | 0.35 | 0.50 | 0.67 | 0.44 | 0.43 | 0.43 |
| lbs./hr./ft.² | 23.6 | 23.6 | 5.4 | 10.2 | 8.1 | 12.3 | 7.2 | 10.2 | 13.4 | 9.0 | 8.9 | 8.9 |
| Water Temperature: | | | | | | | | | | | | |
| In, °C | 65 | 60 | 80 | 75 | 76 | 77 | 78 | 77 | 75 | 76 | 77 | 76 |
| Out, °C | | | 56 | 60 | 60 | 59 | | | | | | |
| Agitation, r.p.m. | | 406 | 511 | 420 | 406 | 427 | 434 | 434 | 455 | 497 | 395 | 395 |
| Analysis: | | | | | | | | | | | | |
| Total Phenol, Percent in Feed | 0.85 | 0.85 | 0.85 | 0.85 | 1.06 | 1.25 | 1.25 | 1.25 | 1.25 | 1.95 | 2.05 | 1.71 |
| Total Phenol, Percent after Processing | 0.14 | 0.11 | 0.05 | 0.09 | 0.31 | 0.42 | nil | nil | nil | 0.03 | 0.05 | 0.05 |
| Rewashed— | | | | | | | | | | | | |
| Free phenol, percent | 0.06 | 0.11 | | | 0.12 | 0.12 | | | | | | |
| Sodium phenate, percent | 0.08 | nil | | | 0.19 | 0.30 | | | | | | |

*Column flooded.

Comparing runs 1 and 2 with 3 and 4, the limiting variable is temperature. In this particular operation a minimum of 75° C. inlet water temperature is required for efficient operation. It is then a simple matter to adjust the flow rates to achieve complete rapid removal of impurities continuously.

The form of the total phenol shows which portion of the column is limiting under the operation conditions used. For example, in run No. 2 the total phenol content and the free phenol content are the same. This shows that the water wash section performed its function perfectly because all the sodium phenate was removed. However, the soda ash section did not convert all the free phenol to sodium phenate. As indicated, this was corrected by increasing the water temperature at the inlet. In run No. 6 the total phenol content is much larger than the free phenol content, indicating that the water wash zone of the column was limiting since all the sodium phenate formed in the soda ash section was not washed out in the water wash zone. Moreover, the efficiency of the soda ash zone is low because the free phenol content is higher than the maximum allowable. The operation is corrected by lowering the ratio of the crude slurry to water and increasing the ratio of soda ash to crude slurry.

In another specific embodiment of the invention the material to be processed is a solution in toluene of 2-(2-cyanoethoxy)ethylacrylate containing acrylic acid, toluene sulfonic acid and other impurities. It is necessary to treat the product with brine to reduce solubility of the monomer and to neutralize the free acidity. It is then necessary to remove the excess base. Therefore, two separate operations are needed: A wash to reduce solubility of the monomer and neutralize free acidity and a wash to remove excess base.

The objects are accomplished in the extraction column described but the organic solution containing a small amount of toluene sulfonic acid in suspension is lighter than water and is pumped into the bottom of the column where it rises countercurrently through the washing stages. Caustic soda solution (25%) is fed into the middle of the column and 25% brine into the top of the column. The rising organic liquid first contacts a mixture of the brine and caustic which neutralizes the free acidity. The brine prevents excessive loss of product by diminishing solubility in the aqueous phase. The excess caustic is then removed in the upper half of the column. The flow of caustic is preferably adjusted so as to maintain in the column a wash solution containing 3-5% caustic soda. The brine fed into the column may vary from 25% to saturated sodium chloride solution. Preferably, the process is conducted at room temperature.

It is intended to cover all changes and modifications of the examples of the invention herein chosen for purposes of disclosure which do not constitute departures from the spirit and scope of the invention.

What is claimed is:

1. A method of washing an organic liquid ester containing as impurities organic acid in solution and inorganic salt in suspension which comprises continuously feeding the material to be extracted into a mixing zone into contact with combined aqueous washes of different treating agents, passing it countercurrently through successive stages of contact without separating layers, fresh water being introduced continuously near the opposite end of the mixing zone and aqueous alkaline solution being introduced continuously at an intermediate point.

2. A method of washing O-p-nitrophenyl di(lower alkyl)phosphorothioate containing inorganic salts including sodium bicarbonate in suspension and p-nitrophenol in solution which comprises continuously feeding the material to be extracted near the top of a mixing zone into contact with combined aqueous washes of different treating agents and passing it countercurrently through successive stages of contact, fresh water being introduced continuously near the bottom of the mixing zone and aqueous soda ash solution at an intermediate point, the temperature of the water at the inlet being maintained at a minimum of 75° C.

3. A method of washing an organic liquid acrylic acid ester partially soluble in water with aqueous washes of different treating agents which ester is lighter than the washes and contains acrylic acid impurities which comprises continuously feeding the ester to be treated near the bottom of a mixing zone into contact with combined aqueous washes of different treating agents and passing it countercurrently through successive stages of contact, aqueous concentrated brine being introduced near the top of the mixing zone and an aqueous solution of base being introduced near the midpoint of the mixing zone.

References Cited in the file of this patent

UNITED STATES PATENTS

| | | |
|---|---|---|
| 2,274,373 | Lyman | Feb. 24, 1942 |
| 2,368,595 | Johnson | Jan. 30, 1945 |
| 2,575,224 | Manske et al. | Nov. 13, 1951 |
| 2,605,279 | Edwards et al. | July 29, 1952 |
| 2,663,721 | Dvornikoff et al. | Dec. 22, 1953 |
| 2,701,783 | Long et al. | Feb. 8, 1955 |